(12) United States Patent
Nordstrom et al.

(10) Patent No.: US 9,609,901 B2
(45) Date of Patent: Apr. 4, 2017

(54) ADAPTIVE PLANAR SHIFT GARMENT MATERIAL

(71) Applicant: Nike, Inc., Beaverton, OR (US)

(72) Inventors: Matthew D. Nordstrom, Portland, OR (US); Patrick Williams, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 146 days.

(21) Appl. No.: 14/249,916

(22) Filed: Apr. 10, 2014

(65) Prior Publication Data

US 2014/0304896 A1 Oct. 16, 2014

Related U.S. Application Data

(60) Provisional application No. 61/811,230, filed on Apr. 12, 2013.

(51) Int. Cl.
*A41D 27/00* (2006.01)
*A41D 27/28* (2006.01)
*A41D 31/00* (2006.01)

(52) U.S. Cl.
CPC ............ *A41D 27/00* (2013.01); *A41D 27/28* (2013.01); *A41D 31/0038* (2013.01); *A41D 2400/20* (2013.01); *A41D 2500/00* (2013.01)

(58) Field of Classification Search
CPC ...... A41D 27/00; A41D 1/00; A41D 2400/20; A41D 2500/00
USPC ......................................................... 422/119
See application file for complete search history.

(56) References Cited

U.S. PATENT DOCUMENTS

| 4,998,311 A | * | 3/1991 | Ernst | ..................... A47C 7/021 297/228.1 |
| 5,267,519 A | * | 12/1993 | Uglene | ............. A41D 31/0016 112/420 |
| 5,709,897 A | * | 1/1998 | Pearlstein | ............ B65D 81/264 426/106 |
| 8,336,117 B2 | | 12/2012 | Carter et al. | |

OTHER PUBLICATIONS

International Search Report with Written Opinion dated Jul. 30, 2014 in Application No. PCT/US2014/033799, 8 pages.
International Preliminary Report on Patentability dated Oct. 22, 2015 in Application No. PCT/US2014/033799, 7 pages.

* cited by examiner

*Primary Examiner* — Sean E Conley
(74) *Attorney, Agent, or Firm* — Shook, Hardy & Bacon L.L.P.

(57) ABSTRACT

Articles and methods of using and making adaptive garment portions are provided. An adaptive garment portion is one that has shifting surfaces with apertures that shift from an aligned to an offset orientation depending on environmental conditions/stimuli. For example, a first surface material and a second surface material may be coupled by a responsive material portion. The responsive material portion may physically change in response to a change in environmental conditions internal or external to the garment (e.g., thermal energy, moisture) and/or stimuli (e.g., light energy, electrical energy, magnetic fields). The physical change in the responsive material portion facilitates the planar shift of the first surface material relative to the second surface material.

22 Claims, 8 Drawing Sheets

ADAPTIVE PLANAR SHIFT GARMENT MATERIAL

CROSS-REFERENCE TO RELATED APPLICATION

This application having claim priority to U.S. Provisional Application No. 61/811,230, filed Apr. 12, 2013, entitled "ADAPTIVE PLANAR SHIFT GARMENT MATERIAL". The entirety of the aforementioned application is incorporated by reference herein.

BACKGROUND

A garment traditionally provides a relatively static level of heat dissipation and/or moisture movement. Therefore, a person may select an appropriate garment based on a current state of needed heat/moisture control or a future anticipated heat/moisture control. However, that static nature of the garment fails to adapt with the changes in the person's differing heat and moisture management needs. For example, an athlete may compete on a cool day that prior to exerting energy in the athletic event needs insulative characteristics to their garment. However, once the activity increases and the person generates body heat and perspiration, the static garment may no longer be appropriate as it was intended to provide warmth on the cool day as opposed to help dissipate the generated heat and moisture during the activity.

SUMMARY

Embodiments of the present invention relate to adaptive garment portions and methods of using and manufacturing the adaptive garment portions. An adaptive garment portion is one that has shifting surfaces with apertures that shift from an aligned to an offset orientation depending on environmental conditions or other stimuli. For example, a first surface material and a second surface material may be coupled by a responsive material portion. The responsive material portion may physically change in response to a change in environmental conditions (e.g., thermal energy, moisture) and/or an application of stimuli (e.g., electrical energy, magnetic field, and light energy). The physical change in the responsive material portion facilitates the planar shift of the first surface material relative to the second surface material. Depending on the environmental condition/stimuli, the apertures may align to facilitate dissipation of heat and/or moisture or they may be offset, which reduces the effectiveness of the dissipation of heat and/or moisture, in an exemplary aspect.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to adaptive garment portions and methods of using and manufacturing the adaptive garment portions. An adaptive garment portion is one that has shifting surfaces with apertures that shift from an aligned to an offset orientation depending on environmental conditions or other stimuli. For example, a first surface material and a second surface material may be coupled by a responsive material portion. The responsive material portion may physically change in response to a change in environmental conditions (e.g., thermal energy, moisture) and/or an application of stimuli (e.g., electrical energy, magnetic field, and light energy). The physical change in the responsive material portion facilitates the planar shift of the first surface material relative to the second surface material. Depending on the environmental condition/stimuli, the apertures may align to facilitate dissipation of heat and/or moisture or they may be offset, which reduces the effectiveness of the dissipation of heat and/or moisture, in an exemplary aspect.

Accordingly, in one aspect, the present invention provides an adaptive garment portion made with a first material portion with a first aperture. The first material portion has a top surface and a bottom surface in a first planar direction. The adaptive garment portion also includes a second material portion having a second aperture. The second material portion has a top surface and a bottom surface in the first planar direction. The adaptive garment portion is also made with a responsive material. The responsive material is connected to the first material portion bottom surface and to the second material portion top surface. The first aperture is offset a first amount from the second aperture in the first planar direction at a first state of the responsive material. However, the first aperture is offset a second amount from the second aperture in the first planar direction at a second state of the responsive material.

In another aspect, the present invention provides a method of shifting a first layer of an adaptive garment portion relative to a second layer in response to heat or moisture. The method includes offsetting a first aperture of a first material portion in a first plane from a second aperture of a second material portion in a second plane when exposed to a first environmental condition and/or stimuli, which may as experienced proximate the first layer and/or the second layer (e.g., relative garment internal or external environmental conditions). The second plane and the first plane are substantially parallel. The method also includes a responsive material positioned between and coupled with the first material portion and the second material portion reduces the offset between the first aperture and the second aperture in response to a change from the first environmental condition to a second environmental condition.

A third aspect of the present invention provides a method of manufacturing an adaptive planar shift material that is adaptive in response to environmental condition changes and/or the introduction/elimination of stimuli. The method includes affixing a top surface of a responsive material portion to a bottom surface of first material portion. Further, the method includes affixing a bottom surface of the responsive material portion to a top surface of a second material portion. The method also includes exposing the responsive material portion as affixed with the first material portion and the second material portion to a first environmental condition and/or a first stimuli state. Additionally, the method includes creating an aperture through the first material portion and the second material portion after a predetermined event.

Having briefly described an overview of embodiments of the present invention, an exemplary operating environment suitable for implementing embodiments hereof is described below.

Aspects of the present invention are directed to a layered material having a top layer with holes or other perforations and a bottom layer material also having holes and or perforations. The top layer material and the bottom layer material are coupled, at least in part, with one another with a responsive material layer. It is contemplated that the top layer and the bottom layer are integrally formed with the responsive layer. The responsive material layer responds to changes in the environment or stimuli proximate the top layer and/or the bottom layer, such as changes in temperature, moisture content (e.g., humidity and/or water droplets), electrical energy, magnetic fields, or light energy. The response of the responsive material may be a physical change, such as an extension or contraction of one or more portions (e.g., fibers, discrete portions) of the responsive material. Because the top material layer and the bottom material layer are coupled together by way of the responsive material layer, it is contemplated that the physical changes of the responsive material layer causes a physical relative movement between the top material layer and the bottom material layer. This shifting of the top and bottom material layers may be used to achieve an "opening" and a "closing" effect as a perforation on the top material layer shifts from being aligned to being offset from a perforation of the bottom material layer, as will be discussed hereinafter.

The planar shifting of the openings of the top and bottom material layers may be used for controlling airflow and moisture movement from a first side of the combined materials to a second side of the combined materials. For example, if the responsive material is incorporated with the top and bottom material layers such that the openings of the layers are aligned with an increase in temperature, a greater transfer of air through the openings are allowed, which may facilitate cooling the environment. Similarly, if the responsive material is integrated to align the openings of the layers in the presence of water vapor or droplets, the material combination adapts in the presence of the water vapor/droplets to become more breathable through the planar shifting of the top and bottom materials.

It is contemplated that the top material and the bottom material, referred to collectively as the "face materials," in combination with the responsive material layer, may be integrated into a garment or other article to be worn or used in connection with the human body. For example, the face materials coupled by the responsive material, the combination of the materials is generally referred to as the "adaptive material" herein, may be integrated into clothing (shirts, pants, undergarments, socks), footwear (e.g., shoes, boots), outerwear (e.g., coats, shells), protective gear, accessories (e.g., hats, gloves), and the like. Therefore, it is contemplated that changes in body temperature or perspiration cause the responsive material to physically change resulting in an adaptive material that responds to changes in the temperature or conditions surrounding a wearer. Similarly, it is contemplated that changes in the external environment, such as precipitation and/or sunlight, may also cause a response by the responsive material. While garments in general have been discussed, it is contemplated that the adaptive material may also or in the alternative be used in a number of other environments and functions. For example, it is contemplated that the adaptive material may be used as a temperature or humidity regulating component in automobiles, aircraft, buildings, and the like. Further, it is contemplated that the temperature and/or the humidity at which the responsive material responds may also be adjusted to satisfy the desired ranges of utilization. Additional applications and adaptations are contemplated herein and will be discussed in greater detail.

Figure 1:
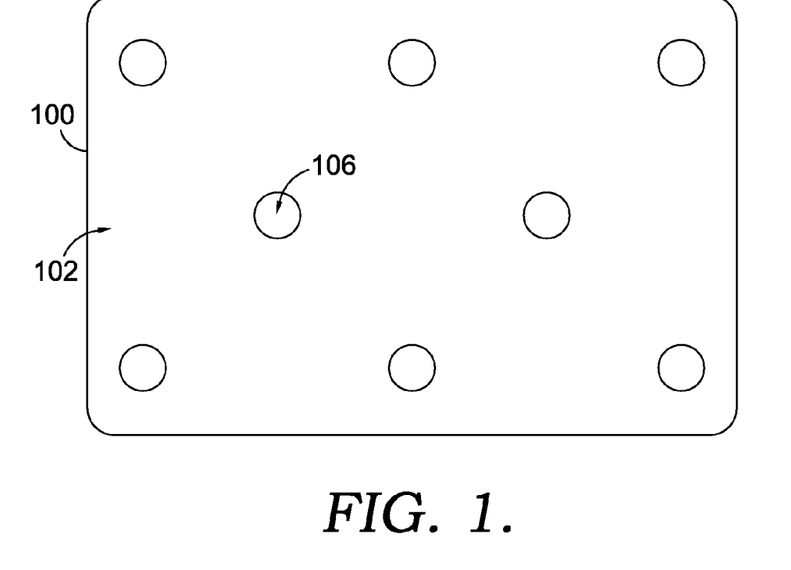
FIG. 1 depicts an exemplary top surface of a surface material, in accordance with aspects of the present invention.

Referring to the drawings in general, and initially to FIG. 1 in particular, depicts an exemplary top surface 102 of a surface material 100, in accordance with aspects of the present invention. The surface material may also be referred to as a face material, as indicated above. The surface material 100 is contemplated as being formed from a number of materials and methods. For example, a surface material may be formed from an organic material (e.g., cotton, wool, silk, bamboo) and/or an inorganic material, such as a polymer-based material. Examples of polymer-based materials may include, but are not be limited to polyester, nylon, polyurethane, and the like. Further, it is contemplated that blends and other combinations of organic and/or inorganic materials may be used in any combination. Further, it is contemplated that a surface material may be formed from a number of manufacturing techniques. For example, it is contemplated that knitting, weaving, printing, extruding, additive manufacturing, and/or non-woven techniques may be implemented. In particular, it is contemplated that a surface material may be formed, at least in part, as a double knit or a spacer knit material having polyester and/or polyurethane materials incorporated therein. Therefore, it is contemplated that the surface material may be a textile, a film, a knit article, a non-woven, or any other suitable substance, in an exemplary aspect.

The surface material 100 is contemplated as forming an outer surface of an adaptive material, such that another surface material may be coupled by a responsive material. As such, the responsive material would be positioned between two surface materials. The surface material 100 is comprised of a plurality of apertures, such as an aperture 106. An aperture may be an opening that is formed in the surface material through a manufacturing process. For example, an aperture may be formed with a laser, knife, die cut, hot knife, punch, and the like. It is also contemplated that an aperture is formed as part of the surface material 100 formation. For example, knitting and/or weaving techniques may be utilized to integrally form an aperture within (and through) the surface material 100. Further, it is contemplated, as provided herein, that the face materials and the responsive material are integrally formed in a common manufacturing technique, such as knitting.

While not depicted, but as will be discussed hereinafter, the surface material 100 has an opposite surface to the top surface 102. The opposite surface is referred to as a bottom surface. Further, while a specific arrangement of apertures is depicted for exemplary purposes, it is contemplated that any size, shape, orientation, and/or pattern of apertures may be implemented. Additionally, it is contemplated that the apertures may be formed in a specific pattern, location, shape, and/or orientation based on a desired use and location of use. For example, a selection of apertures along a chest region of an article of clothing may be different from a selection of apertures in an underarm region of the article. Further yet, the depicted shape of the surface material 100 is merely for illustrative purposes and instead it is contemplate that any shape, dimension, pattern, and orientation may be implemented in connection with aspects of the present invention.

Figure 2:
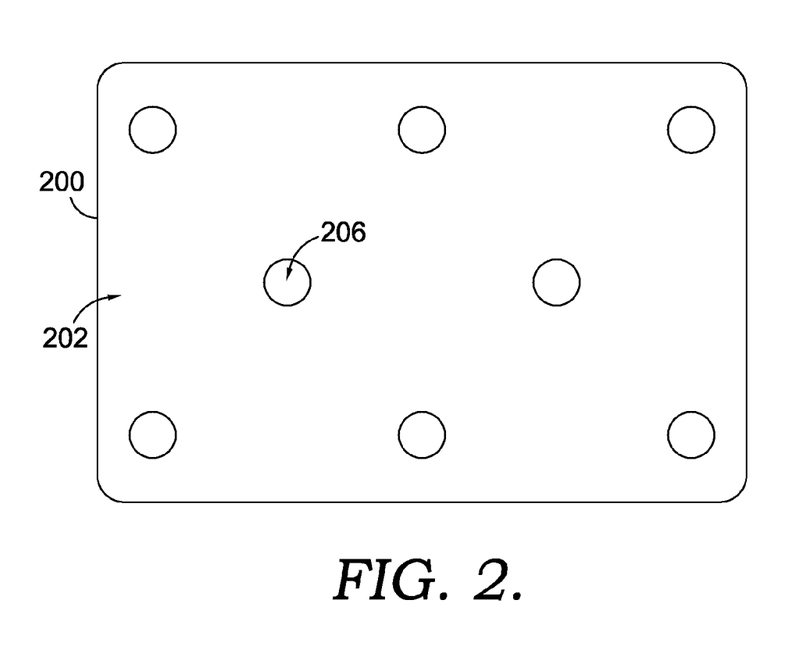
FIG. 2 depicts an exemplary top surface of a surface material, in accordance with aspects of the present invention.

FIG. 2 depicts an exemplary top surface 202 of a surface material 200, in accordance with aspects of the present invention. The surface material 200 is similar in concept to the surface material 100 discussed with respect to FIG. 1 hereinabove. For example the surface material 200 is contemplated as being constructed from similar material and from similar manufacturing techniques as discussed hereinabove.

The surface material 200 is comprised of a plurality of apertures, such as an aperture 206. In an exemplary aspect, the aperture 206 and the aperture 106 of FIG. 1 are contemplated as being positioned, shaped, sized, and/or oriented such that they may be shifted from an aligned position to an offset position by way of a responsive material affixed between the two surface materials. As also previously discussed with respect to the surface material 100 of FIG. 1, it is contemplated that the apertures of the surface material 200 may be of any size, shape, orientation, location, position, quantity, and pattern.

Figure 3:
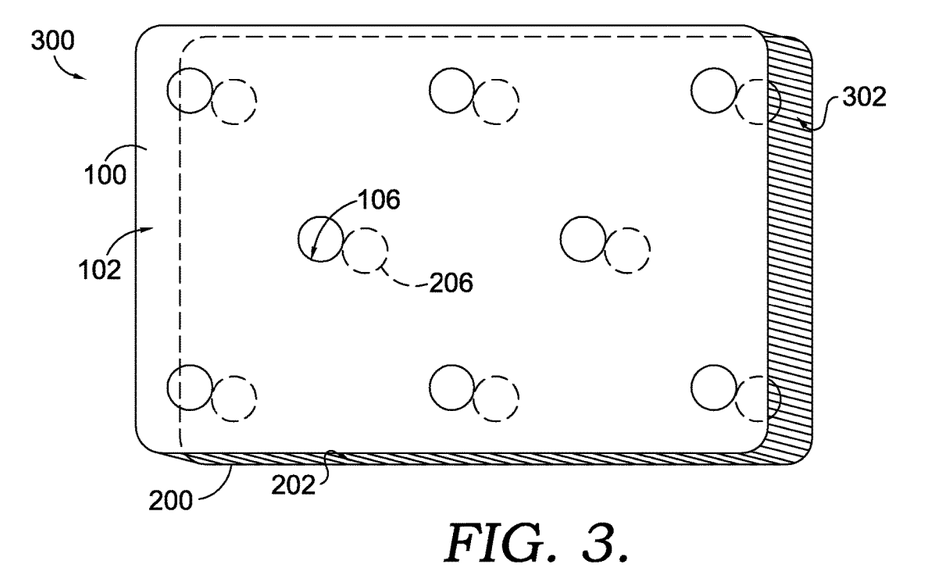
FIG. 3 depicts an adaptive material formed from the surface material offset and coupled with the surface material by a responsive material, in accordance with aspects of the present invention.

FIG. 3 depicts an adaptive material 300 formed from the surface material 100 offset and coupled with the surface material 200 by a responsive material 302, in accordance with aspects of the present invention. The surface material 100 is within a first plane and the surface material 200 is within a second plane, such that the first plane and the second plane are substantially parallel. Similarly depicted is the aperture 106 of the surface material 100 as offset from the aperture 206 of the surface material 200. The aperture 206 is depicted in a dashed line for illustrative purposes as it is obscured by the surface material 100 as a result of the offsetting of the two surface materials.

Offsetting of the surface materials may include a lateral shift within the first plane (and/or the second plane) of the surface material(s). Stated differently, the aperture 106 is offset in FIG. 3 in a lateral direction to the aperture 206. Additionally, an offset of another form is also depicted in FIG. 3 between the aperture 106 and the aperture 206. The offset in a perpendicular direction to the first (and/or second) plane also is present. Stated differently, a vertical offset representing a distance between the first plane and the second plane as defined by the surface material 100 and the surface material 200 respectively is also present. This vertical distance may be described as a distance between the surface 100 and the surface 200 irrespective of an aperture location.

Therefore, it is contemplated that an aperture of a top material layer may be offset from an aperture of a bottom material layer in 1) a lateral direction (e.g., X and/or Y axial direction) and/or 2) a vertical direction (e.g., Z axial direction). Within FIG. 3, the aperture 106 is depicted as being laterally offset from the aperture 206 at least an amount equal to the diameter of the aperture 106. Stated differently, it is contemplated that a first surface layer may be offset from a second surface layer at least an amount equal to the largest of an aperture on the first surface layer or the second surface layer. In an exemplary aspect, the lateral offset between a first surface layer and a second surface layer is equal to at least an amount of a distance required such that a first aperture of the first surface layer does not overlap an aperture of the second surface layer. By having a lateral offset of at least that distance, an exchange of air and/or moisture is limited relative to if there was an overlap of apertures on the different surface layers. This limitation on exchange of air and/or moisture may provide insulative characteristics or other environmental control characteristics.

Additionally, it is contemplated that altering the vertical offset also controls and alters environmental conditions. For example, a greater vertical offset between surface layers effectively increases the potential volume of insulative area, such as air maintained the surface layers. Therefore, by reducing a vertical offset between surface layers, the adaptive material 300 is less insulative and therefore able to facilitate a reduction of heat maintained by the adaptive material 300. Stated conversely, increasing a vertical offset between surface layers effectively increases an insulative quality of the adaptive material 300 to maintain thermal energy more effectively.

The responsive material 302 is depicted as extending between a bottom surface of the surface layer 100 and the top surface 202 of the surface layer 200. It is contemplated that the responsive material 302 is a material that physical changes (e.g., reacts physically) to changes in environmental conditions. Environmental conditions include, but are not limited to, temperature, moisture (vapor and droplets), light, pressure, and the like. For example, it is contemplated that at a first temperature or relative humidity the responsive material 302 is in a first physical state (e.g., length, thickness, density, shape). However, in a second environmental condition that is different from the first environmental condition, the responsive material 302 is in a second physical state. In an exemplary aspect, it is contemplated that portions (e.g., commonly oriented fibers) of the responsive material 302 may contract in response to an increase in moisture. Similarly, it is contemplated that portions of the responsive material 302 may expand in response to an increase in moisture. It is further contemplated that similar physical state changes may occur in response to the other environmental conditions. As provided herein, the environmental conditions and/or the stimuli may be as experienced at any surface, such as a top surface or a bottom surface or at an internal portion of a resulting article or an external portion of the resulting article. For example, a garment comprised of an adaptive material portion may be responsive to environmental conditions and/or stimuli as exposed on the inside of the garment (e.g., from the human body) and/or from the exterior of the garment (e.g., from the external world/weather).

The responsive material 302 may be formed from a variety of materials. For example, it is contemplated that a shape memory polymer may be used, at least in part. Further, it is contemplated that a polyester and nylon combination may also be used that is responsive to environmental conditions. The responsive material may also be formed from a combination of materials. For example, it is contemplated that a first responsive material portion may be directionally oriented in a common orientation and at least another non-(or less)-responsive material may be oriented in all other directions (or also in the common direction). By having the responsive material portion substantially aligned in a common orientation, in the presence of a stimulus (e.g., a change in an environmental condition or stimuli), the responsive material portions work together to cause a planar shift of surface materials rather than to counteract or bind with one another if unaligned, in an exemplary aspect. Therefore, the FIG. 3 responsive material 302 is depicted having a common orientation substantially aligned in the direction of the lateral offset between the aperture 106 and the aperture 206. As will be discussed in greater detail hereinafter, it is contemplated that the directionality of responsive materials may be implemented in a variety of manners.

Figure 4:
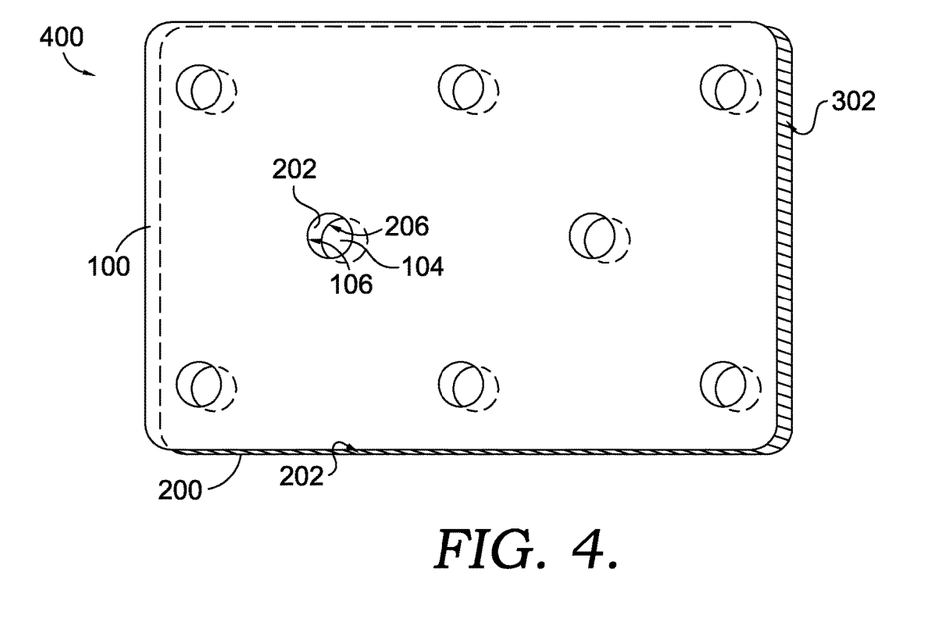
FIG. 4 depicts an adaptive material formed from the surface material offset and coupled with the surface material by the responsive material, in accordance with aspects of the present invention.

FIG. 4 depicts an adaptive material 400 formed from the surface material 100 offset and coupled with the surface material 200 by the responsive material 302, in accordance with aspects of the present invention. The lateral offset between the aperture 106 and the aperture 206 is less than that depicted in FIG. 3. As such, a portion of the surface material 200 top surface 202 is depicted through the aperture 106. However, an open area 104 that extends through both the aperture 106 and the aperture 206 is also illustrated. The open area 104 is a result of a partial lateral offset between the apertures. Stated differently, the amount of offset between the aperture 106 and the aperture 206 is less than the greater size of the aperture 106 or aperture 206. Stated even differently, at least a portion of the aperture 106 overlaps with a portion of the aperture 206.

As depicted in FIG. 4, the vertical offset, as measured perpendicular to the first plane and the second plane of the surface material 100 and 200, is also reduced relative to that of FIG. 3. Therefore, it is contemplated that both a vertical offset and a lateral offset may change in response to a change in an environmental condition. However, it is contemplated that a lateral offset may change without affecting a vertical offset. The vertical offset may also change without affecting a lateral offset, in an exemplary aspect. Changes in vertical offset and lateral offset are also depicted in FIGS. 6-8 hereinafter as related to FIGS. 3-5 respectively.

Figure 5:
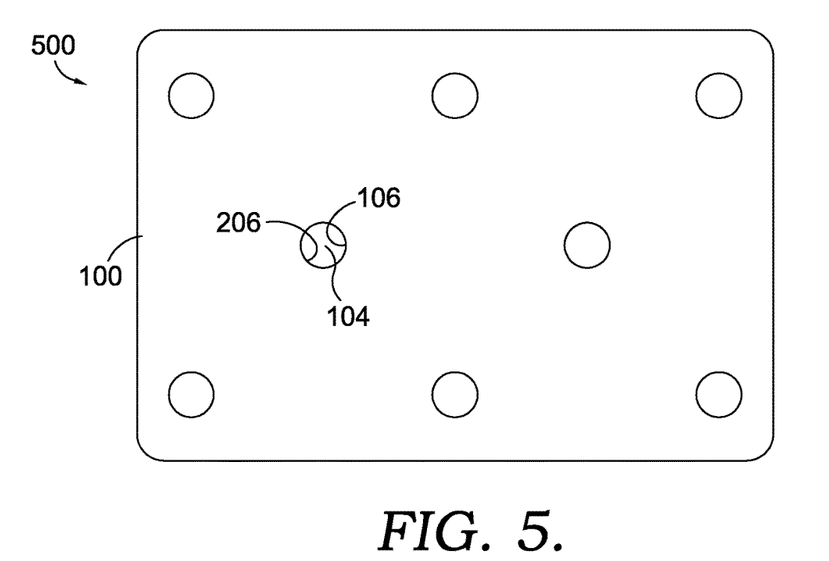
FIG. 5 depicts an adaptive material formed from the first surface material laterally aligned and coupled with the second surface material by the responsive material, in accordance with aspects of the present invention.

FIG. 5 depicts an adaptive material 500 formed from the surface material 100 laterally aligned and coupled with the surface material 200 by the responsive material 302, in accordance with aspects of the present invention. FIG. 5 is a final progression in the illustrated reduction of lateral offsetting and vertical offsetting from FIGS. 3 and 4 previously. For example, starting at a first low temperature at FIG. 3, the apertures 106 and 206 are out of alignment by the lateral offset to inhibit breathability and the transport of thermal energy through the adaptive material. However, as the temperature rises, the responsive material 302 physically changes causing a progression of greater alignment of the apertures 106 and 206 as illustrated in FIGS. 4 and 5. Such that after the responsive material 302 is exposed to a particular environmental condition, such as thermal energy, the responsive material 302 physically changes causing a planar shift of the surface material 100 and the surface material 200 to align the aperture 106 and 206 allowing a greater dissipation of thermal energy and/or moisture from one side of the adaptive material to another side of the adaptive material. This change in ability to breath and dissipate (e.g., a reduction in insulation characteristics) allows for an adaptive garment to aid in the regulation of a wearer's temperature through the dissipation of heat and evaporation of moisture.

Figure 6:
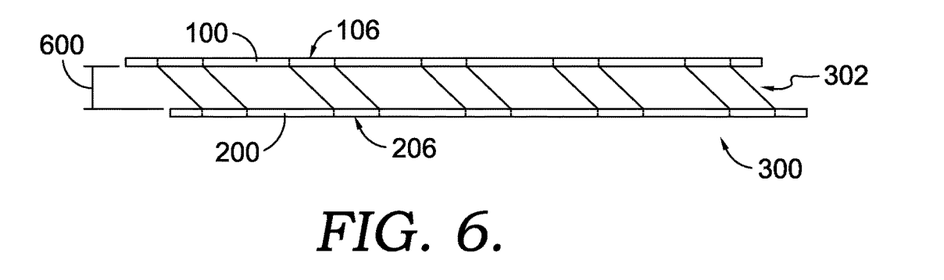
FIG. 6 depicts a cross sectional view of the adaptive material of FIG. 3 formed from the first surface material offset and coupled with the second surface material by the responsive material, in accordance with aspects of the present invention.

FIG. 6 depicts a cross sectional view of the adaptive material 300 of FIG. 3 formed from the surface material 100 offset and coupled with the surface material 200 by the responsive material 302, in accordance with aspects of the present invention. As depicted, a vertical offset distance of 600 is depicted between the surface material 100 and the surface material 200. Also depicted is a common orientation of the responsive material 302 that extends in a lateral direction substantially parallel to direction of intended lateral shift for the lateral offsetting.

Figure 7:
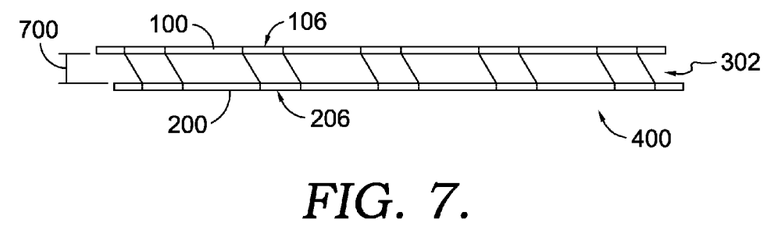
FIG. 7 depicts a cross sectional view of the adaptive material of FIG. 4 formed from the first surface material offset and coupled with the second surface material by the responsive material, in accordance with aspects of the present invention.
Figure 8:
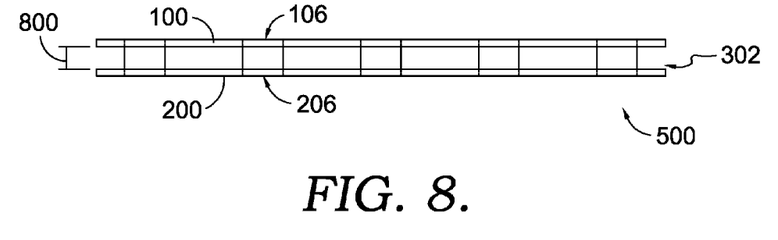
FIG. 8 depicts a cross sectional view of the adaptive material of FIG. 5 formed from the first surface material offset and coupled with the second surface material by the responsive material, in accordance with aspects of the present invention.

FIG. 7 depicts a cross sectional view of the adaptive material 400 of FIG. 4 formed from the surface material 100 offset and coupled with the surface material 200 by the responsive material 302, in accordance with aspects of the present invention. As depicted, a vertical offset distance of 700 is depicted between the surface material 100 and the surface material 200. As depicted, the distance 700 is less than the distance 600 of FIG. 6. As previously discussed, it is contemplated that the reduction in distance from the distance 600 to the distance 700 may provide a reduced insulative characteristic to the adaptive material allowing for more effective dissipation of thermal energy.

FIG. 8 depicts a cross sectional view of the adaptive material 500 of FIG. 5 formed from the surface material 100 offset and coupled with the surface material 200 by the responsive material 302, in accordance with aspects of the present invention. As depicted, a vertical offset distance of 800 is depicted between the surface material 100 and the surface material 200. As depicted, the distance 700 is less than the distance 600 of FIG. 6. As previously discussed, it is contemplated that the reduction in distance from the distance 600 to the distance 700 may provide a reduced insulative characteristic to the adaptive material allowing for more effective dissipation of thermal energy.

As also seen in the progression through FIGS. 6, 7, and 8, the lateral offset between the aperture 106 and the aperture 206 reduces across the FIGS. 6-8 respectively.

Figure 9:
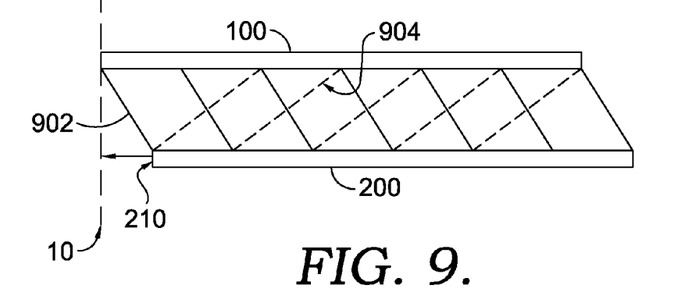
FIG. 9 depicts an exemplary cross sectional view of an adaptive material formed from the first surface material and the second surface material coupled together by a responsive material formed from a portion 902 and a portion 904, in accordance with aspects hereof.

FIG. 9 depicts an exemplary cross sectional view of an adaptive material formed from the surface material 100 and the surface material 200 coupled together by a responsive material formed from a portion 902 and a portion 904. The portion 902 of the responsive material is depicted in a solid line indicating an active or environmentally responsive material while the portion 904 is depicted with a dashed line representing a passive or less environmentally responsive material, in an exemplary aspect.

In an exemplary aspect, the portion 902 is responsive to an environmental condition to a greater degree than the portion 904. Therefore, in the presence of a change in that environmental condition, a lateral shift occurs such that the surface material 200 laterally sifts in the direction of illustrative plane 10. This shift may occur through the contraction of the portion 902, which are substantially oriented in a common direction allowing for the shift of surface material 200 towards the plane 10.

It is contemplated that the portion 904 may be a material that is less responsive or non-responsive to the same stimuli (e.g., temperature, moisture) as the portion 902. Further, it is contemplated that the portion 904 may have a sufficient modulus of elasticity allowing the lateral shift of the surface portions relative to one another as caused by the portion 902. Further, it is contemplated that the portion 904 provides a force that resists the portion 902 such that when an environmental condition changes allowing for an increase in aperture offset, the portion 904 helps facilitate that shift if the portion 902 is less efficient in that direction of shift (e.g., more effective in tension than compression).

Figure 10:
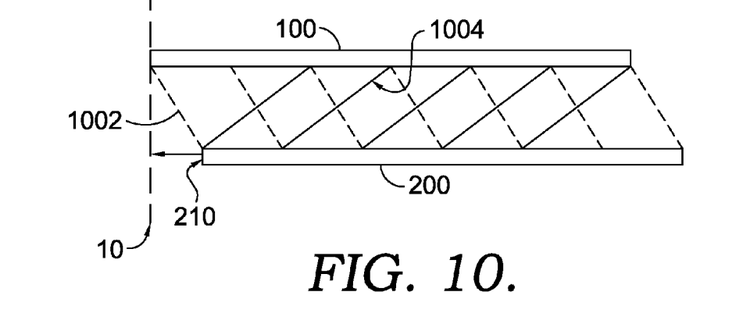
FIG. 10 depicts an exemplary cross sectional view of an adaptive material formed from the first surface material and the second surface material coupled together by a responsive material formed from a portion 1002 and a portion 1004, in accordance with aspects hereof.

FIG. 10 depicts an exemplary cross sectional view of an adaptive material formed from the surface material 100 and the surface material 200 coupled together by a responsive material formed from a portion 1002 and a portion 1004, in accordance with aspects hereof. The portion 1004 of the responsive material is depicted in a solid line indicating an active or environmentally responsive material while the portion 1002 is depicted with a dashed line representing a passive or less environmentally responsive material, in an exemplary aspect. In this example, the portion 1004 may rely on a compressive force to cause a shift of the surface material 200 having an end 210 in the direction of the plane 10. The portion 1002 may have a compressive characteristic such that as the portion 1004 exerts a force on the surface material 200 causing a shift in the direction of the plane 10, the portion 1002 compresses (or otherwise deforms) to allow the shift to occur. Similarly, the portion 1002 may be effective for shifting the surface 200 away from the plane 10 when the environmental conditions in which the portion 1004 was reacting is removed.

Both FIGS. 9 and 10 are discussed from the perspective of moving from an offset to an aligned condition. However, it is contemplated that the introduction of a stimuli may take an adaptive material from an aligned state to an unaligned (i.e., offset) state. As such the logical changes based on the disclosure provided herein to the configurations of the portions (e.g., 902, 904, 1002, and 1004) are contemplated.

Figure 11:
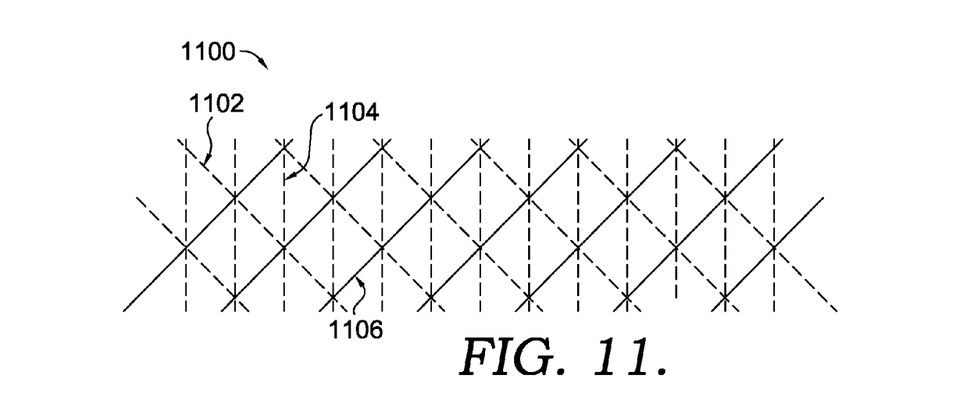
FIG. 11 depicts an exemplary responsive material portion orientation, in accordance with aspects of the present invention.

FIG. 11 depicts an exemplary responsive material 1100 material portion orientations, in accordance with aspects of the present invention. The portions forming the responsive material 1100 may include materials 1102, 1104, and 1106. Each of the material in combination may form the responsive material 1100. However, in this example, only the material 1106 is active in response to a change of an environmental condition. In this example, the various materials may be oriented in a variety of ways; however, the active material 1106 is oriented in a common direction, in this example to facilitate a shift in surface materials relative to one another. Therefore, the material 1102 and 1104 may bind and stabilize the material 1106 allowing for the physical change of the material 1106 to translate into a shifting or lateral/vertical change of the responsive material 1100 as a whole.

While specific materials and orientations of those materials are discussed, as will be illustrate din FIGS. 13 and 14 hereinafter, the responsive material may be an intermittently placed material that is formed at particular locations between the surface material 100 and the surface material 200.

Figure 12:
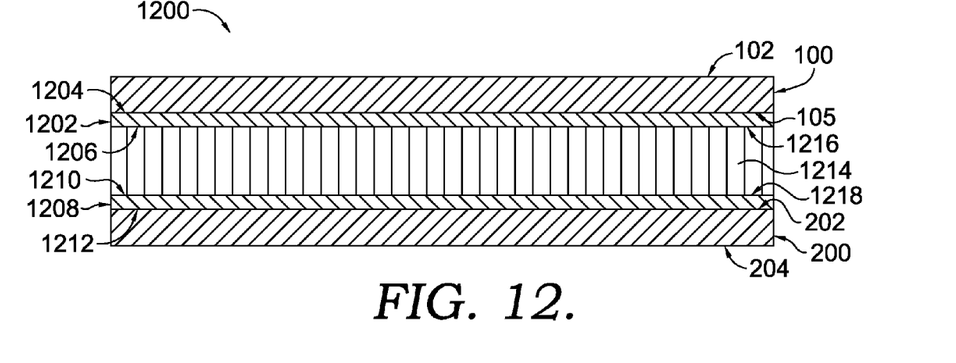
FIG. 12 depicts an exaggerated cross sectional view of an exemplary adaptive material, in accordance with aspects of the present invention.

FIG. 12 depicts an exaggerated cross sectional view of an exemplary adaptive material 1200, in accordance with aspects of the present invention. The adaptive material 1200 is comprised of the surface material 100 having the top surface 102 and a bottom surface 105. The adaptive material may also be comprised of an affixing layer 1202 having a top surface 1204 and a bottom surface 1206. The affixing layer 1202 may be an adhesive, a binder, chemical bonding layer, a physical bonding layer, or any other mechanism for coupling a top surface 1216 of a responsive material 1214 to the bottom surface 105 of the surface material 100. In an exemplary aspect, the affixing layer 1202 is an adhesive layer on a film forming the surface material 100, in an exemplary aspect. The responsive material 1214 is also comprised of a bottom surface 1218. The bottom surface 1218 is coupled with the top surface 202 of the surface material 200 by way of a bottom affixing layer 1208. The bottom affixing layer 1208 having a top surface 1210 and a bottom surface 1212. As discussed previously, the affixing layer 1208 may be any mechanism to effectively couple the responsive material 1214 with the top surface 202 of the surface material 200. The surface material 200 is further comprised of a bottom surface 204.

In an exemplary aspect, the bottom surface 204 may be proximate a body of a wearer while the top surface 102 may be distal the body, such as exposed to the outside environment, in an exemplary aspect.

Figure 13:
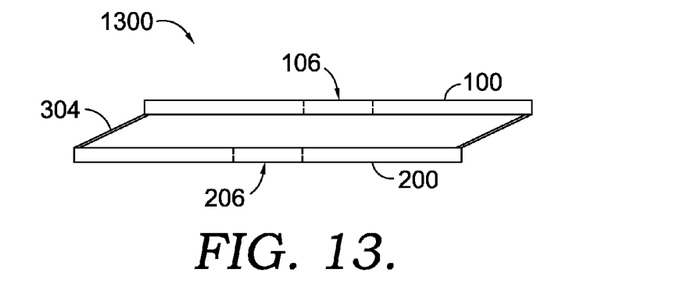
FIG. 13 depicts a side profile perspective of an exemplary adaptive material comprised of a discretely positioned responsive material between the first surface material and the second surface material, in accordance with aspects of the present invention.

FIG. 13 depicts a side profile perspective of an exemplary adaptive material 1300 comprised of a discretely positioned responsive material 304 between the surface material 100 and the surface material 200, in accordance with aspects of the present invention. The responsive material 304 may, for example, be a shape memory polymer material that has a first shape allowing for the alignment of the apertures 106 and 206 at a first temperature and a second shape allowing for the lateral offset of the apertures 106 and 206 at a second temperature. It is contemplated that the responsive material 304 may be printed or extruded. Further, it is contemplated that the first shape and/or the second shape may be taught prior to or after being integrated into the adaptive material 1300. Therefore, it is contemplated that the responsive material may be located uniformly or selectively relative to one or more aperture and/or one or more surfaces. Further, it is contemplated that the responsive material may be formed with a uniform collection of fibers or selectively located fibers that are responsive. Similarly, it is contemplated that the responsive portion of a responsive material may be positioned at a perimeter of the material, at a perimeter of an aperture, at a perimeter of a group of aperture, between apertures, or anywhere that facilitates the desired planar shift.

While a simple geometry of a discrete responsive material 304 is depicted, it is contemplated that a number of geometric formation that in response to environmental condition changes a physical shape, which causes a planar shift of surface material portions. Further, FIG. 13 depicts an example where the vertical offset increases as the lateral offset decreases. However, it is contemplated that a discrete responsive material portion may also be integrated such that a vertical offset and a lateral offset both increase/decrease together. For example, the first shape could instead be taught at the second environmental condition and the second shape may be taught at the first environmental condition.

Figure 14:
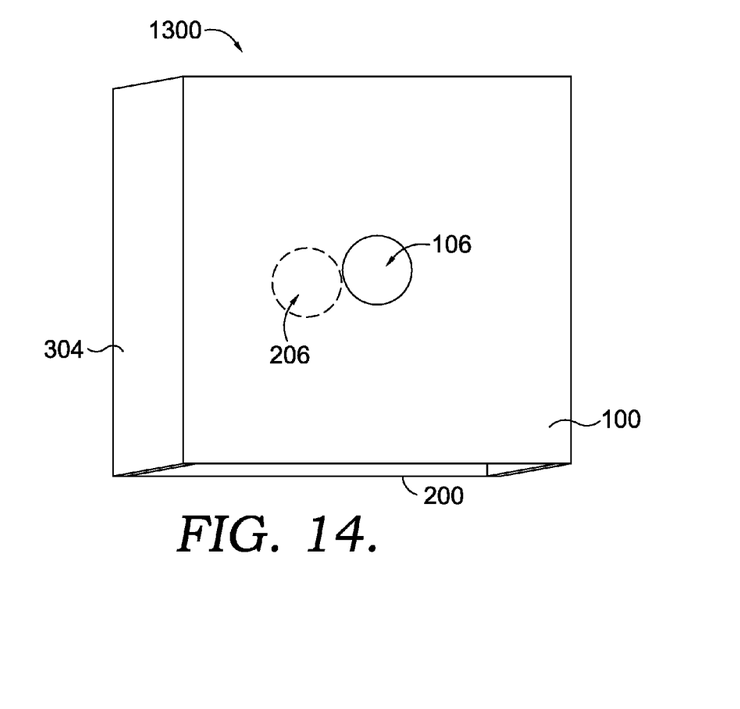
FIG. 14 depicts a top down perspective of the adaptive material discussed in FIG. 13 above, in accordance with aspects of the present invention.

FIG. 14 depicts a top down perspective of the adaptive material 1300 discussed in FIG. 13 above, in accordance with aspects of the present invention. In this example, the discrete responsive material 304 may extend a finite amount in one or more directions, as opposed to covering the entirety of a surface of the surface materials 100 or 200.

Figure 15:
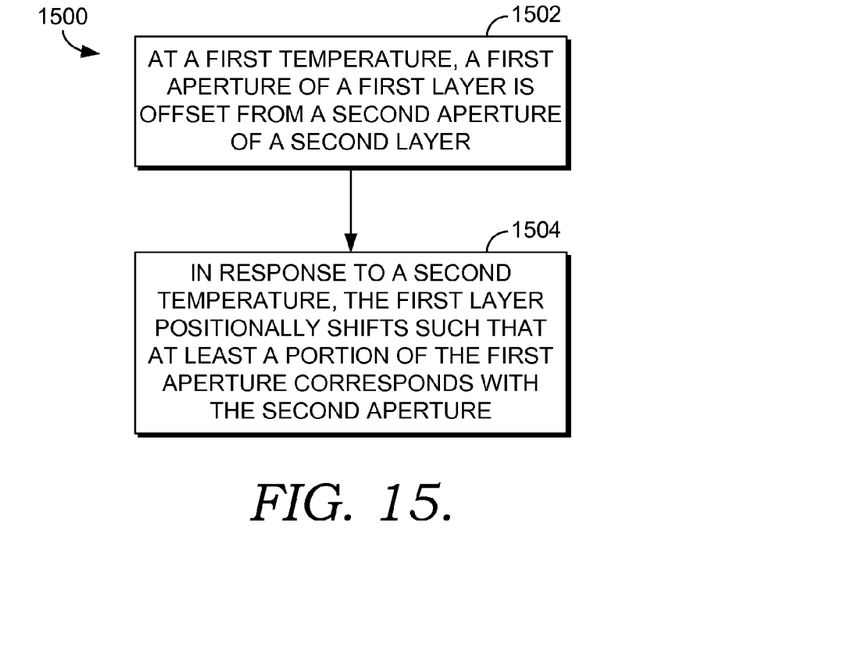
FIG. 15 illustrates a block diagram illustrating a method for offsetting a first aperture in a first layer from a second aperture in a second layer of an adaptive material in response to a temperature, in accordance with aspects of the present invention.

FIG. 15 illustrates a block diagram illustrating a method 1500 for offsetting a first aperture in a first layer from a second aperture in a second layer of an adaptive material in response to a temperature, in accordance with aspects of the present invention. At a block 1502, the first aperture is offset from the second aperture at a first temperature. In an exemplary aspect, the first temperature may be any temperature, such as anything below about 37 degrees Celsius (an average temperature of human skin). Additional temperatures may be used, such as 50, 45, 40, 35, 30, 25, 20 degrees Celsius and any temperature between.

The offset may be a lateral offset and/or a vertical offset, in an exemplary aspect. It is contemplated that the adaptive material may be integrated into a garment as worn by a person. During a physical activity in which the user generates heat, the environmental conditions proximate the person's body may change, such as an increase in the skin temperature. Similarly, it is contemplated that a person may reduce their activity and therefore the temperature near their skin may drop as excess heat is dissipated. In the step 1502, it is contemplated that in an effort to increase the maintenance of heat (e.g., insulative characteristics of the garment), the first and second apertures are offset, which inhibits the dissipation of thermal energy.

At a block 1504, the first layer positionally shifts such that at least a portion of the first aperture corresponds with the second aperture in response to a second temperature. In an exemplary aspect, the second temperature is greater than the first temperature; however, it is also contemplated that the first temperature may be greater than the second temperature. In an exemplary aspect, in response to an increase in temperature, the adaptive material at least partially aligns the apertures to encourage a greater transfer of thermal energy through the apertures' partial alignment. It is contemplated that the increase in the temperature may be in response to a person wearing a garment formed from the adaptive material performing a physical task, such as an athletic activity, that increases the body temperature of the person. Other responses are also contemplated. For example, the aperture may start in alignment and with a drop in temperature a shift may occur that offsets the apertures.

Figure 16:
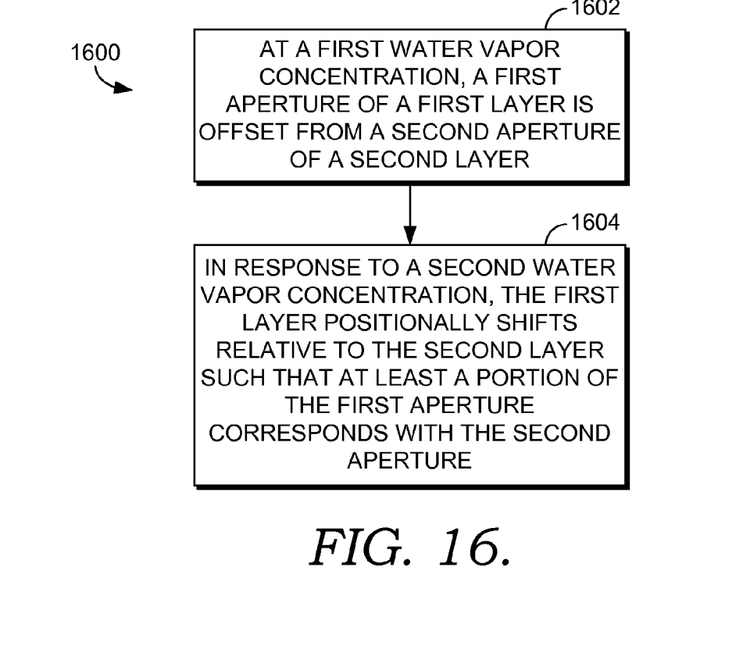
FIG. 16 illustrates a block diagram illustrating a method for offsetting a first aperture in a first layer from a second aperture in a second layer of an adaptive material in response to a first water vapor concentration, in accordance with aspects of the present invention.

FIG. 16 illustrates a block diagram illustrating a method 1600 for offsetting a first aperture in a first layer from a second aperture in a second layer of an adaptive material in response to a first water vapor concentration, in accordance with aspects of the present invention. At a block 1602, the first aperture is offset from the second aperture at a first water vapor concentration. The water vapor concentration may translate to a relative humidity or other measure of moisture content in a volume of space.

At a block 1604, the first layer positionally shifts such that at least a portion of the first aperture corresponds with the second aperture in response to a second water vapor concentration. In an exemplary aspect, the second water vapor concentration is greater than the first water vapor concentration. Stated differently, in response to an increase in water vapor concentration, the adaptive material at least partially aligns the apertures to encourage a greater transfer of humidity through the apertures' partial alignment. It is contemplated that the increase in the water vapor concentration may be in response to a person wearing a garment formed from the adaptive material performing a physical task, such as an athletic activity, that increases a perspiration (i.e., sweat) rate of the person.

Figure 17:
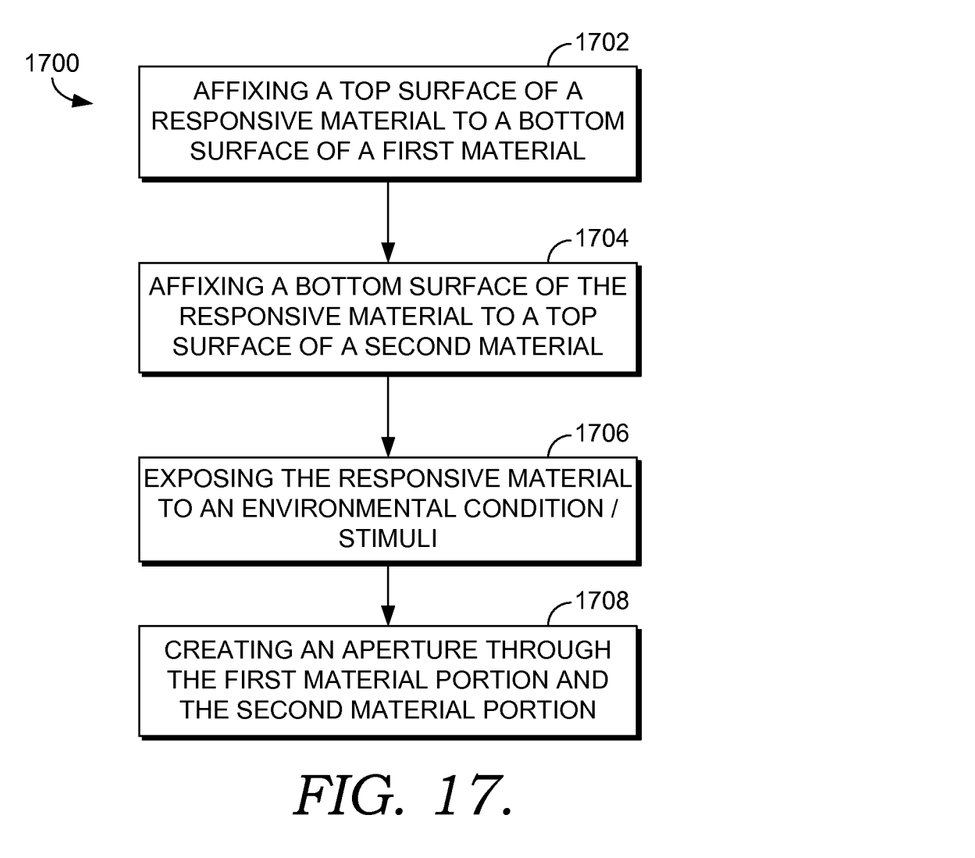
FIG. 17 illustrates a block diagram illustrating a method for manufacturing an adaptive planar shift material that adaptive in response to environmental condition/stimuli changes, in accordance with aspects of the present invention.

FIG. 17 illustrates a block diagram illustrating a method 1700 for manufacturing an adaptive planar shift material that adaptive in response to environmental condition changes, in accordance with aspects of the present invention. At a block 1702, a top surface of a responsive material is affixed to a bottom surface of a first material. For example, as previously discussed, it is contemplated that a surface material portion may be affixed to a responsive material portion. Similarly, at a block 1704, a bottom surface of the responsive material is affixed to a top surface of a second material. As previously discussed, the affixing may be accomplished with adhesive, chemical bonding agents, mechanical bonding agents, welding, and/or other affixing techniques. The blocks 1702 and 1704 form the adaptive material having a first surface material coupled with a second surface material by way of the responsive material.

At a block 1706, the responsive material is exposed to an environmental condition or stimuli. The environmental condition or stimuli may be a target temperature, a target moisture level, a particular electrical field, a particular magnetic field, and/or a particular light energy at which an aperture of the first material and an aperture of the second material are desired to substantially align. The responsive material may be maintained at the environment condition for a period of time to allow a physical transformation to occur within the responsive material (e.g., expand, contract, change shape).

At a block 1708 an aperture is created that extends though the first material portion and the second material portion. In an exemplary aspect, the aperture may also extend through the responsive material as well. However, it is contemplated that the responsive material may not be located at the aperture or that the responsive material may provide sufficient air and moisture permeability that a discrete aperture may not be necessary. In an exemplary aspect, the exposing of the responsive material to a defined environmental condition essentially trains the adaptive material to align the apertures at the environmental condition at which it was exposed. Stated differently, if the apertures on the first material and the second material are desired to be in substantial alignment at a specific temperature, the responsive material may be exposed and/or maintained at that temperature during the process of creating the aperture. Therefore, when the responsive material transition from a different temperature to the defined temperature used at the time of creating the apertures, the apertures return to the substantially aligned position. While temperature is used for exemplary purposes, it is understood that any environmental condition or other stimuli (e.g., magnetism, electric field) may also be utilized.

The creation of the aperture may occur in response to an event. It is contemplated that he event may be the passing of a predetermined amount of time. Further, it is contemplated that the event may include after a predetermined physical state change has occurred for the responsive material. For example, a measured state change by length, density, displacement, and the like. Further, it is contemplated that a temperature or moisture reading at the surface of the responsive material may be taken and once a defined level is achieved, the aperture may be formed, for example. Other events are also contemplated, such as the availability of a machine to perform the creation of the aperture.

While separate surface materials and responsive materials are discussed herein, it is contemplated that a responsive material alone may be utilized such that an aperture is created through the thickness of the responsive material at a defined environmental condition and at environmental conditions other than the defined condition, the aperture may be restricted or otherwise obstructed based on a physical state change of the responsive material. For example, it is contemplated that the responsive material is a warp-knit spacer mesh that has integrally formed "surface materials" through the knitting process. While a spacer meshes provide an appearance of a separate top surface material and a bottom surface material, the responsive material, the top surface material, and the bottom surface material are all integrally formed. In this example, it is contemplated that strategically placed fibers/yarns may be incorporated that are responsive to environmental conditions/stimuli changes.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

The invention claimed is:

1. An adaptive garment portion, comprising:
   a first material portion comprised of a first aperture, the first material portion having a top surface and a bottom surface in a first planar direction;
   a second material portion comprised of a second aperture, the second material portion having a top surface and a bottom surface in the first planar direction;
   a responsive material that changes from a first physical state to a second physical state in direct response to changes in one or more of temperature, moisture, light energy, magnetic field, or electrical energy, the responsive material coupled to the first material portion bottom surface and to the second material portion top surface;
   the first aperture offset a first amount from the second aperture in the first planar direction when the responsive material is in the first physical state; and
   the first aperture offset a second amount from the second aperture in the first planar direction when the responsive material is in the second physical state.

2. The adaptive garment portion of claim 1, wherein the first material portion and the second material portion are formed from different materials.

3. The adaptive garment portion of claim 1, wherein the first aperture extends through the top surface and the bottom surface of the first material portion.

4. The adaptive garment portion of claim 1, wherein the first material portion and the second material portion are offset in a direction perpendicular to the first planar direction a first distance when the responsive material is in the first physical state; and the first material portion and the second material portion are offset in the direction perpendicular to the first planar direction a second distance when the responsive material is in the second physical state, the first distance and the second distance are different.

5. The adaptive garment portion of claim 4, wherein the first offset is greater than the second offset and the first distance is greater than the second distance.

6. The adaptive garment portion of claim 4, wherein a distance between the first material portion and the second material portion is greater with the first offset than the second offset.

7. The adaptive garment portion of claim 4, wherein the offset in the first planar direction is lateral and the offset in the direction perpendicular to the first planar direction is vertical.

8. The adaptive garment portion of claim 1, wherein the first material portion is comprised of a first plurality of apertures in a first pattern and the second material portion is comprised of a second plurality of apertures in the first pattern, such that the first plurality of apertures and the second plurality of apertures are substantially aligned when the responsive material is in the second physical state.

9. The adaptive garment portion of claim 1, wherein the first material portion is comprised of a first plurality of apertures in a first pattern and the second material portion is comprised of a second plurality of apertures in the first pattern, such that the first plurality of apertures and the second plurality of apertures are substantially not aligned when the responsive material is in the first physical state.

10. The adaptive garment portion of claim 1, wherein the responsive material is at least one of a shape memory polymer, a polyester and nylon blend, and a printed or extruded material.

11. The adaptive garment portion of claim 1, wherein the responsive material is comprised of a first responsive material substantially oriented in a first direction and a second responsive material, wherein the first responsive material is more responsive to temperature or moisture changes than the second responsive material.

12. The adaptive garment portion of claim 1, wherein the responsive material is comprised of a first responsive material substantially oriented in a first direction and a second responsive material oriented substantially in an opposite second direction.

13. A method of shifting a first layer relative to a second layer in response to a first environmental condition comprising one or more of a first thermal value or a first moisture level value, the method comprising:
- at the first environmental condition, offsetting a first aperture of a first material portion in a first plane from a second aperture of a second material portion in a second plane, the second plane and the first plane are substantially parallel; and
- in response to a change from the first environmental condition to a second environmental condition comprising one or more of a second thermal value or a second moisture level value, a responsive material positioned between and coupled with the first material portion and the second material portion reduces the offset between the first aperture and the second aperture.

14. The method of claim 13, wherein the first environmental condition and the second environmental condition further comprise one or more of, respectively:
1) a first electrical stimuli value and a second electrical stimuli value;
2) a first magnetic field value and a second magnetic field value; or
3) a first light energy value and a second light energy value.

15. The method of claim 13, wherein the first aperture and the second aperture are offset in a direction parallel with the first plane.

16. The method of claim 13, wherein the responsive material relies on fibers that contract in response to a change in the one or more of the first thermal value or first moisture level value.

17. The method of claim 13 further comprising, in response from transitioning from the second environmental condition back toward the first environmental condition, the responsive layer increases the offset between the first aperture and the second aperture.

18. The method of claim 13 further comprising reducing a distance between the first plane and the second plane at the first environmental condition to the second environmental condition.

19. A method of manufacturing an adaptive planar shift material that is adaptive in response to environmental condition changes, the method comprising:
- affixing a top surface of a responsive material portion to a bottom surface of the first material portion;
- affixing a bottom surface of the responsive material portion to a top surface of a second material portion;
- exposing the responsive material portion as affixed with the first material portion and the second material portion to a first environmental condition comprising one or more of a first temperature condition, a first moisture condition, a first magnetic field condition, a first electrical energy condition, or a first light energy condition, wherein exposing the responsive material portion to the first environmental condition directly causes the responsive material portion to change from a first physical state to a second physical state; and
- after the change from the first physical state to the second physical state creating an aperture through the first material portion and the second material portion.

20. The method of claim 19, wherein affixing the top surface of the responsive material portion to the bottom surface of the first material portion include integrally forming the responsive material portion and the first material portion.

21. The method of claim 19, wherein the first environmental condition is selected such that the aperture of the first material portion and the second material portion are configured to be aligned.

22. The method of claim 19, wherein the aperture through the first material portion is substantially aligned with the aperture of the second material portion.

* * * * *